United States Patent [19]
Ng

[11] Patent Number: 5,511,894
[45] Date of Patent: Apr. 30, 1996

[54] LOCKABLE QUICK RELEASE MECHANISM

[75] Inventor: Daniel Ng, Somers, N.Y.

[73] Assignee: Industri Ar Thule, Hillerstorp, Sweden

[21] Appl. No.: 292,182

[22] Filed: Aug. 19, 1994

Related U.S. Application Data

[63] Continuation of Ser. No. 945,907, Sep. 17, 1992, Pat. No. 5,362,173.

[51] Int. Cl.$^6$ ...................................... F16B 2/18
[52] U.S. Cl. .................. 403/320; 403/315; 403/324; 224/315; 224/324; 301/110.5
[58] Field of Search ...................... 403/320, 315, 403/321–324, DIG. 4, 374, 313, 24, 373, 409.1; 70/233, 225; 301/110.5; 224/315, 322, 324, 42.42; 211/5, 18

[56] References Cited

U.S. PATENT DOCUMENTS

| | | | |
|---|---|---|---|
| 4,763,957 | 8/1988 | Poemlmann et al. | 301/110.5 |
| 4,789,206 | 12/1988 | Ozaki | 301/110.5 X |
| 4,842,148 | 6/1989 | Bowman | 211/18 |
| 4,906,053 | 3/1990 | Kawai | 280/281.1 |
| 5,135,330 | 8/1992 | Chen | 403/323 X |
| 5,165,762 | 11/1992 | Phillips | 301/110.5 |
| 5,362,173 | 11/1994 | Ng | 403/320 |

FOREIGN PATENT DOCUMENTS

| | | | |
|---|---|---|---|
| 2221329 | 10/1974 | France | 70/225 |
| 2332155 | 6/1977 | France | 224/324 |
| 3034750 | 4/1982 | Germany | 224/315 |

*Primary Examiner*—Kenneth J. Dorner
*Assistant Examiner*—Harry C. Kim
*Attorney, Agent, or Firm*—Novack Druce Herrma Burt

[57] ABSTRACT

In a quick release mechanism, a prong is retained around a skewer, the skewer extending from a fork block, between a bearing surface on the fork block and a bearing surface on a movable member. The movable member is mounted on the skewer and is axially movable thereon. The movable member is moved toward the fork block through a predetermined distance by a moving device which is mounted on the skewer and is axially movable relative thereto. The range of movement of the moving device is adjusted by an adjusting knob which is positioned at various axial positions on the skewer.

24 Claims, 12 Drawing Sheets

LOCKABLE QUICK RELEASE MECHANISM

This application is a continuation of application Ser. No. 07/945,907, filed Sep. 17, 1992, now U.S. Pat. No. 5,362,173.

FIELD OF THE INVENTION

The present invention relates to lockable quick release mechanisms and, more particularly, to lockable quick release mechanisms of the type used in securing bicycle frames to racks.

BACKGROUND AND SUMMARY OF THE PRESENT INVENTION

Quick release mechanisms are often used for such purposes as securing bicycle frames to racks to permit easy removal and attachment of the frames for storage, repair, or theft prevention. Other purposes include securing bicycle seats to frames and securing frames to bicycle wheels. The operation of such quick release mechanisms is substantially the same from application to application and, while the present invention is directed to securing bicycle frames, it is understood that, unless otherwise indicated, the discussion of one use is equally relevant to others.

Bicycle frames generally include a fork assembly having a pair of prongs. The prongs each have a recess at the ends of the prongs either in the form of a hole or in the form of a slot. A wheel is placed between the prongs such that the wheel is located against interior sides of each of the prongs. A shaft extending from the sides of the wheel hub is used to secure the fork relative to the wheel. The wheels are secured between the prongs on the shafts or axles by assemblies including bolts or cotter pins. In order to remove a wheel attached to a frame by such an assembly, it is necessary to have a number of different tools available.

Quick release mechanisms permit easy attachment and removal of bicycle frames from wheels or racks by the simple turn of a lever of a lever assembly fixed at one end of the mechanism, without the need for tools. However, such mechanisms also permit easy theft of bicycle wheels or frames. Consequently, quick release mechanisms have been supplied with means for locking the mechanisms, thus preventing separation of the mechanism and the secured part without a key or combination for the lock. Examples of such mechanisms include U.S. Pat. Nos. 4,028,915, 4,114,409, 4,621,873, 4,724,692, 4,770,011, 4,951,487, 4,964,287, 5,005,390, 5,007,260, 5,022,672, and 5,027,628. Unfortunately, it is possible for people to breach the security provided by many of the foregoing lockable quick release mechanisms by simply breaking a particularly vulnerable component of the mechanism.

In addition to locks, many quick release mechanisms are adapted to accommodate different sized wheels or racks by supplying the mechanisms with a width adjusting assembly. Usually, the width adjusting assembly includes a nut having an interior thread for being screwed over a threaded end of a skewer or shaft to desired positions on the skewer. By positioning the nut at various positions on the threaded end, the distance between the nut and the lever assembly, which is only movable between an open and a closed position, can be varied to accommodate different sized wheels. Examples of such quick release mechanisms include U.S. Pat. Nos. 4,028,915, 4,724,692, 4,842,148, 4,951,487, 4,964,287, 5,005,390, 5,007,260 and 5,022,672.

The foregoing configuration for adjusting assemblies and lever assemblies is, however, often inconvenient in use. For instance, in the above-mentioned patents having width adjusting assemblies, it is necessary to manipulate the adjusting assembly on one side of the mechanism and the lever assembly on the other side of the mechanism simultaneously, with two hands. However, if the bicycle frame is unsteady relative to the mechanism prior to attachment, it is desirable to support the bicycle frame with another hand, which is difficult for most individuals. Further, if the mechanism is part of, for instance, a vehicle roof rack at such a height that, for the particular user, only one side of the mechanism is accessible from either side of the vehicle at a time, then it may be necessary for the user to obtain help.

In accordance with one aspect of the present invention, a mechanism for retaining a prong is provided. The mechanism includes a skewer, the prong being mountable around at least a portion of the skewer. The mechanism further includes a first bearing surface, the skewer extending substantially perpendicularly from the first bearing surface. Also provided is means for engaging the prong to clamp the prong to the first bearing surface, the engaging means being mountable on the skewer and axially movable thereon. The mechanism also includes means for adjusting a range of movement of the engaging means between axial positions on the skewer.

In a further aspect, the adjusting means is mounted on the skewer and axially movable relative thereto.

In a further aspect, the adjusting means has an adjusting means bearing surface and the engaging means has an engaging means bearing surface, the adjusting means bearing surface and the engaging means bearing surface being adapted to contact one another.

In a further aspect, the mechanism includes means for preventing the adjusting means from moving relative to the skewer.

In a further aspect, the engaging means includes a movable member being mountable on the skewer and axially movable thereon, the prong being receivable between the movable member and the first bearing surface, and means for moving the movable member toward the first bearing surface, the moving means being mountable on the skewer and axially movable thereon.

In a further aspect, the engaging means include a lever, the lever being mountable on the skewer, axially movable thereon, and pivotable relative thereto about a lever pivot axis, and a cam surface, the cam surface being adapted to move toward the first bearing surface when the lever is pivoted.

In a further aspect, the lever pivot axis and the skewer substantially intersect and are substantially perpendicular.

In a further aspect, the mechanism is provided with means for locking the lever when the cam surface is moved toward the first bearing surface.

In a further aspect, the mechanism is provided with an underbar plate, the underbar plate at least partially surrounding a bar of a carrier, the locking means locking together the lever, the underbar plate and the first bearing surface.

In a further aspect, the first bearing surface forms at least a portion of a side of a block, the block having an opening for receiving a carrier tray, the opening being formed to be substantially perpendicular to the first bearing surface.

In a further aspect, a mechanism for retaining a two-pronged fork of a bicycle comprises a skewer, the skewer having two ends, the prongs being mountable around at least a portion of the skewer, one end of the skewer having a head for engagement against a prong. Also provided is block means for being received between the prongs, the block means having an axial bore between two bearing surfaces, the skewer extending through the axial bore and substantially perpendicularly from each bearing surface. The mechanism further includes means for engaging the prongs to clamp the prongs to the two bearing surfaces, the engaging means being mountable on the skewer and axially movable thereon, and means for adjusting a range of movement of the engaging means between axial positions on the skewer.

In a further aspect, each bearing surface is formed with a tubular projection through which the axial bore is formed, the portion of the skewer around which the prongs are mountable being disposed at least partially within the axial bore in the projections, the tubular projections being formed such that the prongs are mountable around at least a portion of the tubular projections.

In a further aspect, a mechanism for retaining a two-pronged fork of a bicycle comprises a skewer, the skewer having two ends, the prongs being mountable around at least a portion of the skewer, one end of the skewer having a head for engagement against a prong of the fork. Also provided is block means for securing the prongs to a carrier, the block means having an axial bore between two bearing surfaces, the skewer extending through the axial bore and substantially perpendicularly from each bearing surface. The mechanism further includes a lever, the lever being mountable on the skewer, axially movable thereon, and pivotable relative thereto, a cam surface, the cam surface being adapted to move toward the block means when the lever is pivoted, and means for adjusting a range of movement of the cam surface between axial positions on the skewer. The mechanism also includes means for locking the lever when the cam surface is moved toward the block means.

In a further aspect, the bearing surfaces form at least a portion of two sides of the block means, and the lever, the adjusting means, and the locking means are disposed on one of the sides of the block means.

BRIEF DESCRIPTION OF THE DRAWINGS

The features and advantages of the present invention will be well understood by reading the following detailed description in conjunction with the drawings in which like numerals indicate similar elements and in which.

DETAILED DESCRIPTION OF THE PREFERRED EMBODIMENTS

Figure 1A:
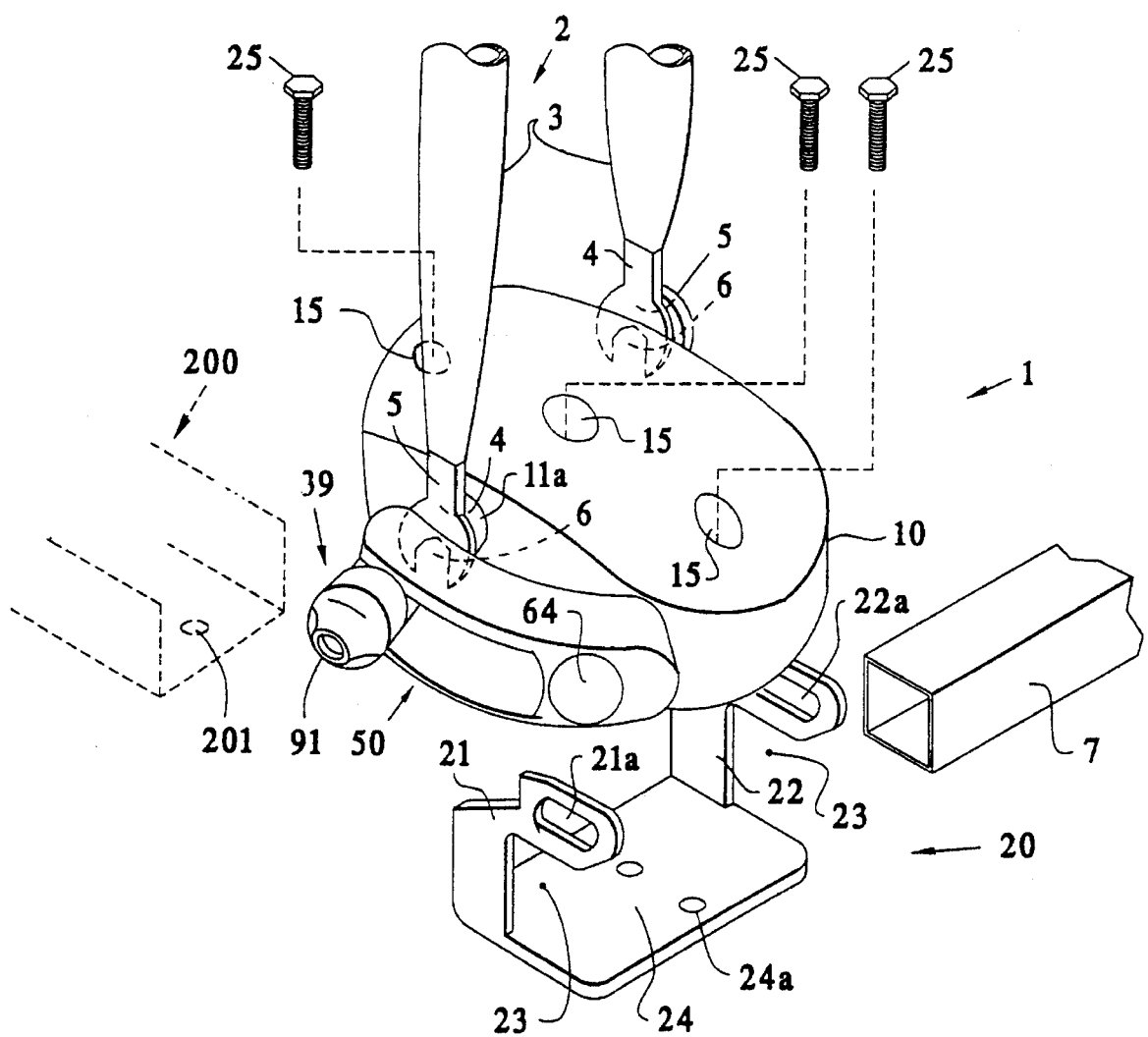
FIG. 1A is a perspective view of a lockable quick release mechanism according to a preferred embodiment of the present invention.

With reference to FIGS. 1–7, a preferred embodiment of a lockable quick release mechanism 1 is shown. A bike fork 2 having two prongs 3, 3, each prong having an interior side 4 toward the interior of the fork and an exterior side 5 toward the exterior side of the fork, is mounted on the lockable quick release mechanism. Each prong 3 is formed with an opening 6 for receiving a bicycle wheel axle (not shown). The lockable quick release mechanism 1 may cooperate with a car roof rack bar or rod 7 of the type used in the Device for Carrying a Load described in, for example, U.S. Pat. No. 4,688,706. The lockable quick release mechanism 1 may further cooperate with a bicycle wheel tray 200, such as that used in the THULE™ Pro Series Fork Mount, Model 529, manufactured by Eldon Group America Inc.

The lockable quick release mechanism 1 comprises a fork block 10 and an underbar plate 20 that may be attached to one another around a longitudinal member such as the car roof rack bar 7. The fork block 10 and the underbar plate 20 are connected to one another such that they at least partially surround the bar 7. Bolt holes 15 are formed in the fork block 10 and threaded bolt holes 24a are formed in the bottom of the underbar plate 20 for bolting the underbar plate to the fork block with bolts 25. Two of the bolt holes 15 and the two threaded bolt holes 24a are formed such that the bar 7 fits between two substantially parallel bolts 25 when the underbar plate and the fork block are bolted together. The threaded bolt holes 24a may be formed by threading holes formed in the underbar plate 20 or by securing nuts 26, as shown in FIG. 1B, to holes formed in the underbar plate.

With reference to FIGS. 1A, 1B, 2, and 3, the underbar plate 20 is substantially U-shaped and includes an L-shaped leg 21 and a leg 22, the L-shaped leg forming an interior area 23 with a bottom 24 of the underbar plate. The interior area 23 is of sufficient size such that the car roof rack bar 7 may be passed therethrough. The legs 21 and 22 of the underbar plate 20 are receivable in leg receiving recesses 16a at opposite ends of a transverse bar receiving recess 16 formed in the bottom 17 of the fork block 10. The fork block 10 is formed with the transverse recess 16 such that the fork block, the leg 21, and the bottom of the underbar plate at least partially extend around all four sides of a square car roof rack bar 7. At least partially surrounding the roof rack bar 7 facilitates proper alignment of the fork block 10 and the underbar plate 20 by the two bolts 25 that extend through two of the bolt holes 15 and the two threaded bolt holes 24a, as well as facilitating the fastening together of the fork block and the underbar plate by the two bolts. The roof rack bar 7 is arranged between the two bolts 25 that extend through two of the bolt holes 15 and the two threaded bolt holes 24a. The leg 22 is preferably also L-shaped such that the underbar plate is symmetrical about a centerline (not shown).

The fork block 10 is further formed with a tray receiving recess 18 on a rear side 19 of the fork block. The recess 18 is formed such that a bicycle wheel tray 200, usually formed in a U-shape, is receivable in the recess. The tray 200 is bolted to the fork block 10 through a bore 15 in the fork block and a bore 201 in the tray by a bolt 25 and nut 26. A bicycle rear wheel (not shown) is secured in a portion of the tray 200.

The fork block 10 includes two fork block bearing surfaces 11, 11 for abutting against the interior sides 4 of the prongs 3. The fork block bearing surfaces 11, 11 are ordinarily parallel to one another and are spaced apart by a distance corresponding to a standard prong-to-prong distance for conventional bicycle forks. Prong-to-prong distances for different sized bicycle forks or for objects other than bicycle forks, such as bicycle seats (not shown), which are larger than the standard prong-to-prong distance of the fork block 10 may be accommodated by the same fork block by positioning one or more spacers (not shown), such as washers, adjacent to the fork block bearing surfaces 11, 11, such that the prong-to-prong distance is the same size or only slightly larger than the distance formed by the distance between the fork block bearing surfaces plus the thicknesses of the spacers.

Figure 4:
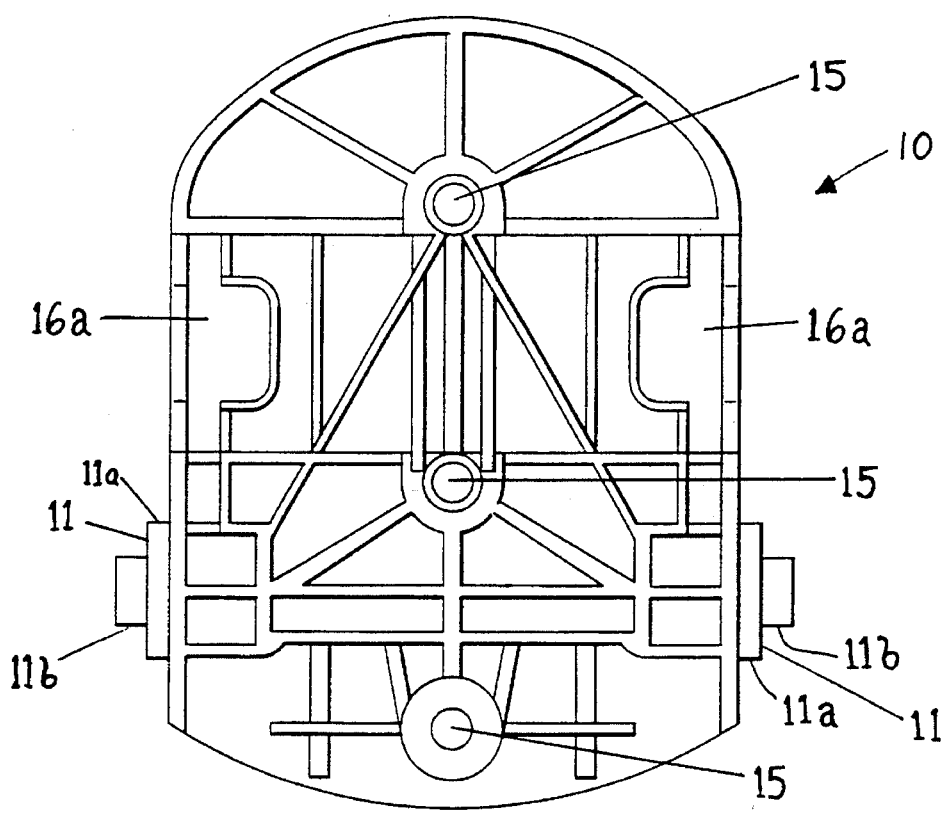
FIG. 4 is a bottom view of a fork block according to an embodiment of the present invention.

A skewer 30 extends substantially perpendicularly from the two fork block bearing surfaces 11, 11 and, in the preferred embodiment, extends through and is axially movable relative to an axial bore 12 formed in each bearing surface and extending through the fork block 10. Each fork block bearing surface 11 is formed on an insert element 11a, usually a steel insert, and the axial bore 12 extends through both the insert element 11a and the bearing surface 11. The insert element 11a is shaped such that at least a portion 11b of the insert element is receivable in the openings 6 of a prong 3. Alternatively, the bearing surfaces 11, 11 may be formed with no insert element and the skewer 30 is shaped such that at least a portion of the skewer on each side of the fork block 10 is receivable in the openings 6 of the prongs 3. In this latter embodiment, the portion of the skewer 30 is formed with a periphery generally corresponding to the shape of the periphery of a conventional bicycle wheel axle so that the openings 6 on bicycle prongs 3, 3 are mounted onto the skewer. The fork block 10 may be formed of a molded plastic material and formed with the above-described recesses and bores. The fork block 10 may be solid, or hollow, or, preferably, as shown in FIG. 4, hollow and formed with an internal honeycomb structure to provide structural integrity at low weight.

Preferably, the two prongs 3, 3 are mounted around the skewer 30 and the insert elements 11a, 11a, onto the portions 11b, 11b, of the insert element, on opposite sides of the fork block 10 and the underbar plate 20. The skewer 30 has a first end 31 that is sized to be extended through the bores 12, 12 in the fork block 10. The second end 32 of the skewer 30 is ordinarily a headed end and is provided with a fixed stop, in the illustrated embodiment a head 33 of sufficient size to prevent the head from passing through the bores 12, 12 or the opening 6 of a bicycle prong 3. One surface of the head 33 forms a head bearing surface 34 against which the side 5 of the prong 3 abuts when a prong is secured on the quick release mechanism 1.

Figure 8A:
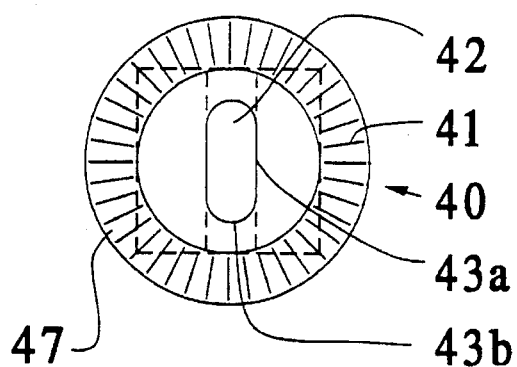
FIGS. 8A–8D are top, bottom, front, and side views of a movable bearing disc member for use in the lever.
Figure 8B:
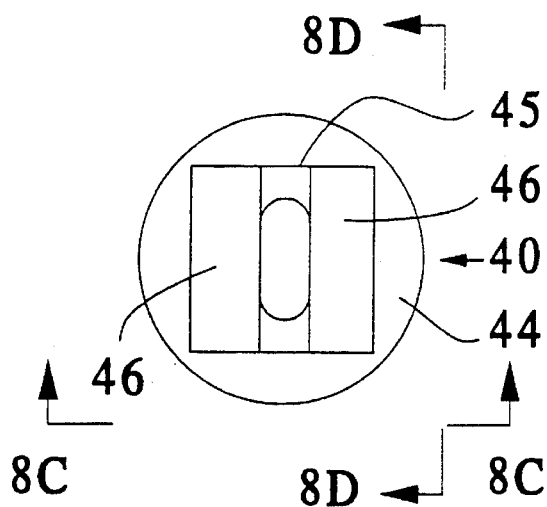

Mounted on and axially movable relative to the skewer 30 is a means 39 for engaging a prong 3 to clamp the prong to one of the fork block bearing surfaces 11. The engaging means 39 includes a movable bearing disc member 40 and means 50 for moving the movable member toward one of the fork block bearing surfaces 11. As best seen in FIGS. 8A–8D, the movable member 40 has a bearing surface 41 for abutting a side 4 or 5 of a prong 3 when the prong is mounted on the skewer 30. The bearing surfaces 11, 11, 34, and 41 against which the sides 4, 4, 5, and 5 of a pair of prongs 3, 3 of a bicycle fork 2 abut when a bicycle frame is secured to the lockable quick release mechanism 1 may be roughened to provide greater friction between the abutting surfaces. As best seen in FIG. 8A, the bearing surface 41 is provided with a pattern of radial serrations or indentations 47 to provide a good gripping effect between the bearing surface and surfaces against which the bearing surface abuts. Similar patterns (not shown) may be formed on the surfaces 11 and 34.

The movable member 40 is provided with a through hole 42 through which the skewer 30 is able to extend perpendicularly to the movable member bearing surface 41. The movable member 40 is preferably provided with means 43 for preventing the movable member from rotating relative to the skewer 30. The through hole 42 is preferably formed with a flattened portion 43a and a rounded portion 43b and the skewer 30 is formed with a flattened portion 36 including two parallel, flattened longitudinal sides 36a, 36a and two rounded longitudinal sides 36b, 36b, such that the skewer is able to move axially in the through hole relative to the movable member but is not able to be turned in the through hole. Alternatives to the foregoing means 43 include forming the skewer 30 with any desired non-circular geometric cross-section and forming the through hole 42 in substantially the same shape to permit axial, but not rotational, movement of the skewer having the selected cross-section. Further, the through hole 42 or the skewer 30 may be formed with a projection or key (not shown) that is received in a longitudinal recess or keyway (not shown) of the skewer or the through hole such that the skewer is axially, but not rotationally, movable relative to the movable member 40. The movable member 40 is unable to move axially on the skewer 30 past the flattened portion 36 as the remainder of the skewer has a larger periphery than the flattened portion. This allows the portion of the skewer around which prongs are mountable to be of a shape conforming to the opening 6 of a prong 3 or a standard circular bore 12 in the fork block 10 and to have the maximum possible cross-sectional area for the maximum possible strength.

On the opposite side 44 of the movable member 40 from the bearing surface 41, a cam follower structure 45 is provided. Parallel cam follower surfaces 46, 46 are provided on two opposite sides of the through hole 42. The follower surfaces 46, 46 are each generally concave in shape and are disposed at a predetermined minimum vertical distance d above the opposite side 44.

Figure 5B:
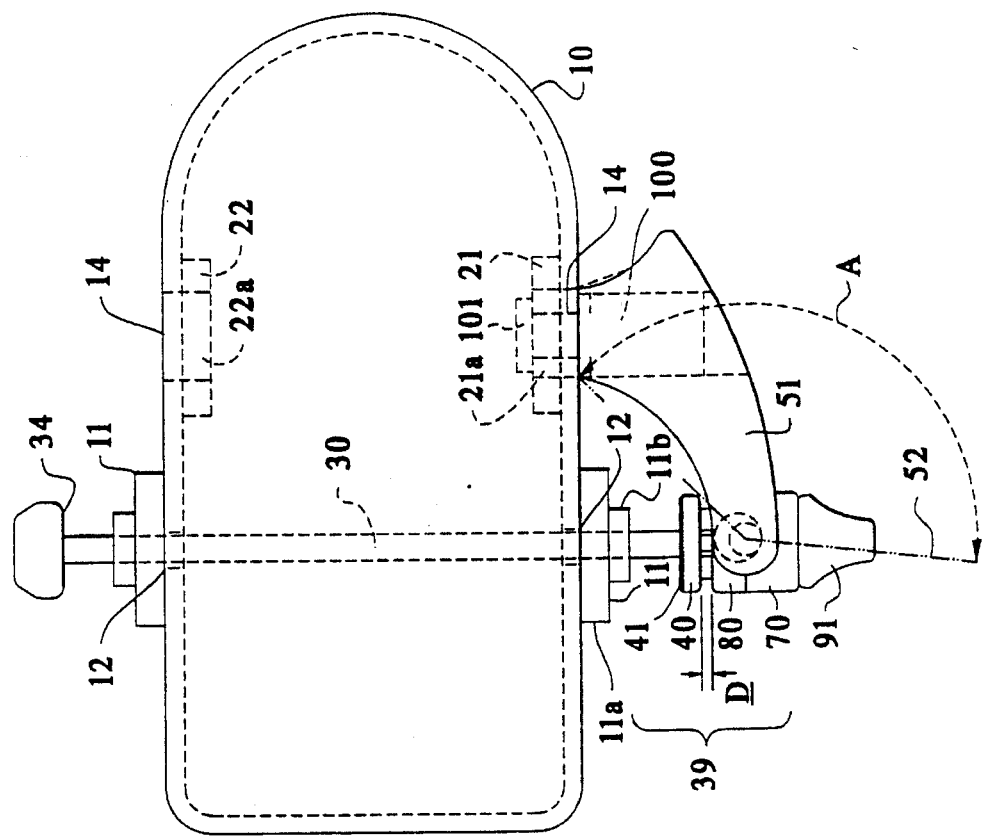
FIGS. 5A and 5B are top views of a lockable quick release mechanism.
Figure 5A:
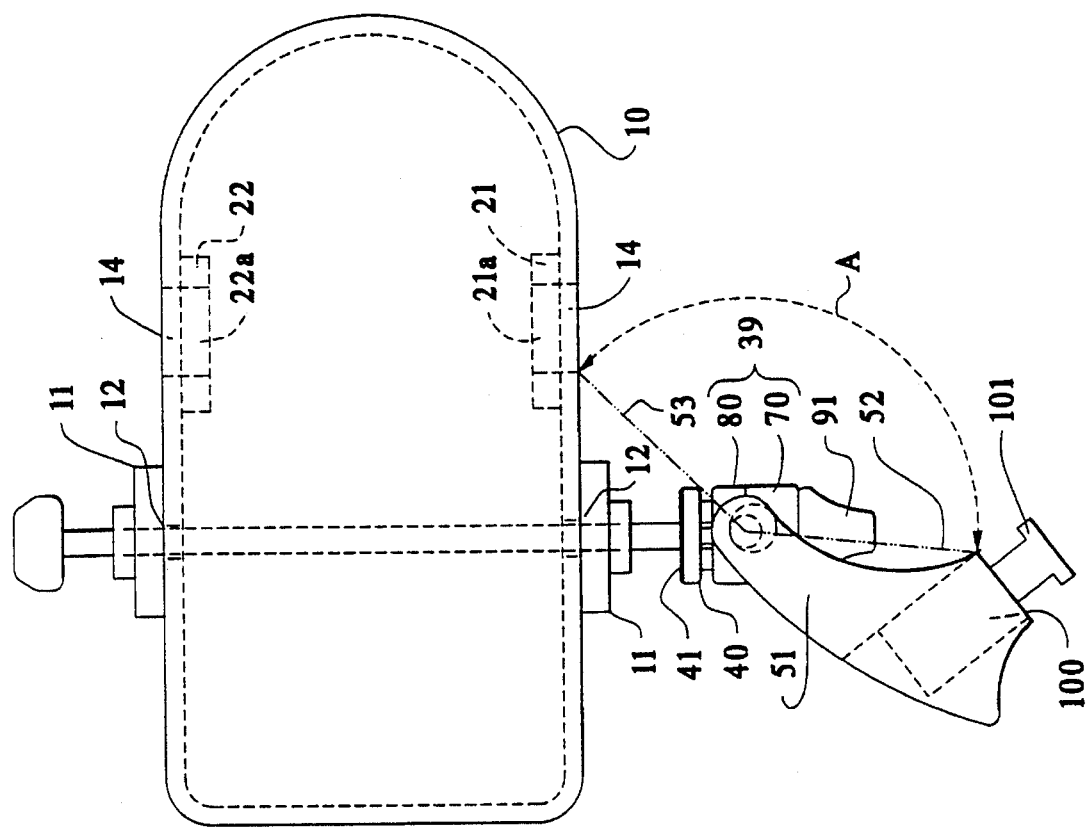

With reference to FIGS. 5A and 5B, the means 50 for moving the movable member 40 toward a bearing surface 11 to clamp a prong 3 comprises a lever arm 51 which pivots through an arc A, shown by a dashed line, between a first position 52, shown by a dashed-and-dotted line, and a second position 53, shown by a dashed-and-dotted line, relative to the moving means to move the movable member 40 toward the fork block 10. When the movable member 40 and the moving means 50 are adjacent to one another, pivoting the lever 51 of the moving means forces the movable member 40 through a clamping distance toward the fork block 10. The sides 4, 5 of a prong 3 may thereby be secured between the movable member 40 and the fork block 10. Another prong 3 may, at the same time, be secured between the fork block 10 and a head 33 of the skewer 30 when the lever arm 51 is moved from the first position 52 to the second position 53.

When the lever arm 51 is moved to the second position 53, such as when it is desired to secure a pair of prongs 3 on the skewer 30, an end 54 of the lever arm 51 is in a predetermined position 55 relative to the fork block 10 and the underbar plate 20. The lever arm end 54 is preferably provided with a lock assembly 100 such that the lever arm end may be locked to the fork block 10 or, more preferably, through the fork block to the underbar plate 20 to lock a bicycle fork 2 to the outside of the fork block 10 and the underbar plate 20 to thereby effectively lock the bicycle fork to the bar 7 on the rack in the lockable quick release mechanism 1. By locating the locking means 100 on the lever arm 51 of the moving means 50 and by further locating the adjusting knob 91 on the same end of the skewer 30 as the moving means, it is possible to adjust, clamp, and lock the quick release mechanism from one side of the fork block 10 with one hand.

Figure 9A:
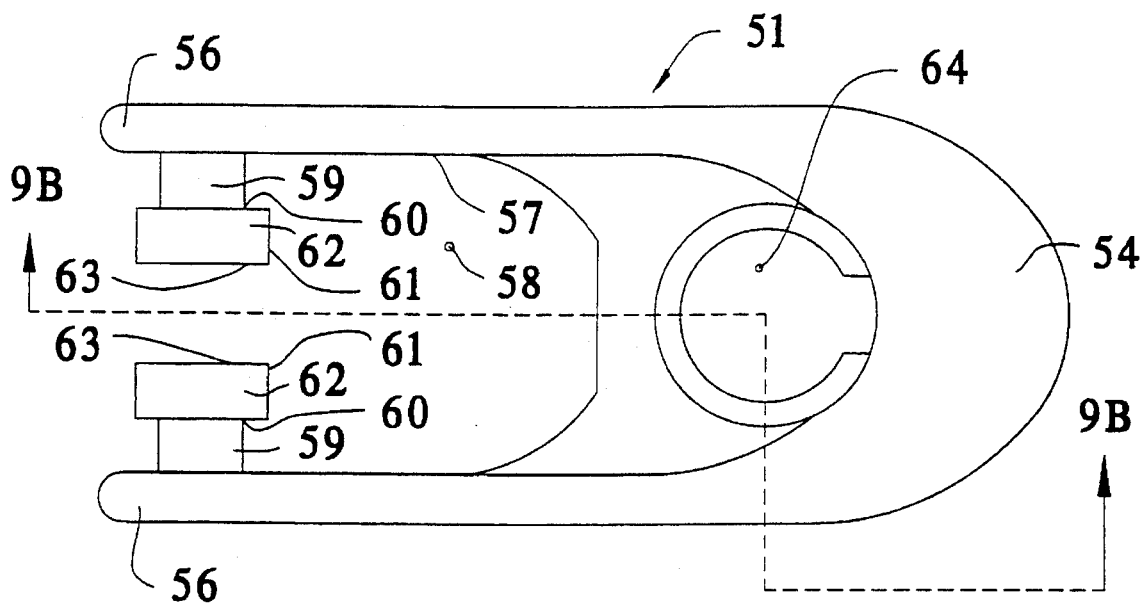
FIG. 9A is a top and FIG. 9B is a partial cross-sectional side view of a lever.
Figure 9B:
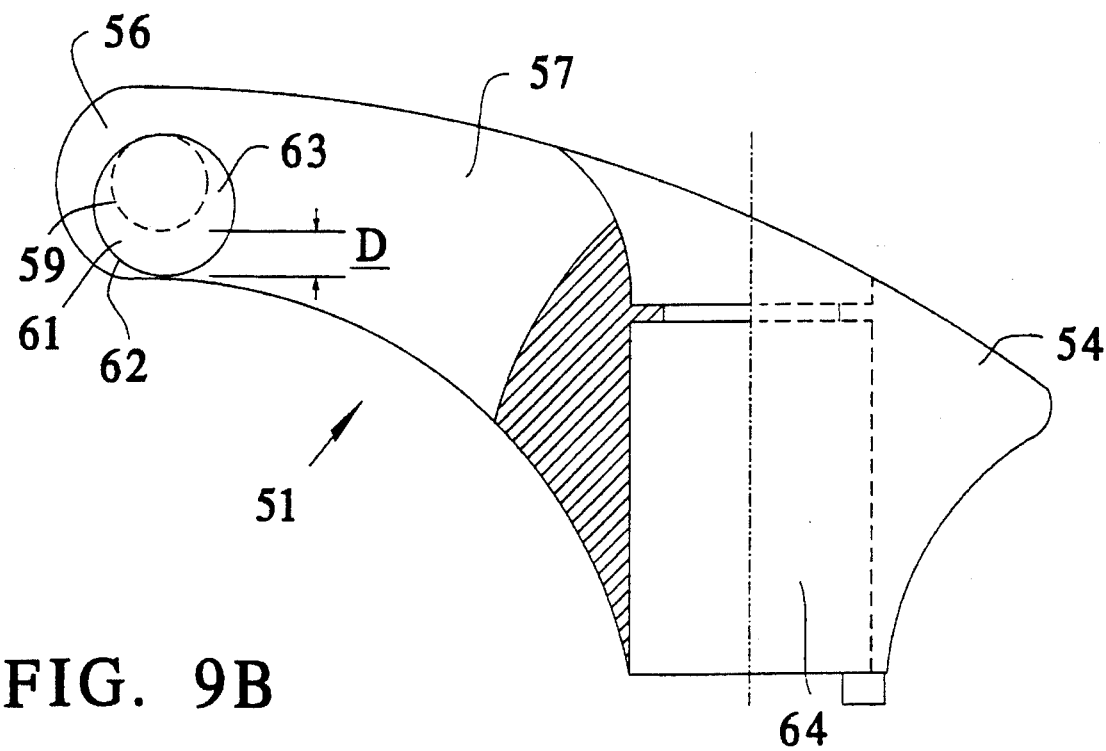

With reference to FIGS. 9A and 9B, another end 56 of the lever arm 51 forms a two-pronged fork, each prong of the fork having a lever arm interior wall 57, the lever arm interior walls 57, 57 defining a portion of a lever arm interior portion 58. Extending substantially perpendicularly from each of the lever arm interior walls 57, 57 are axle segments 59, 59, each having a predetermined length. The axle segments 59, 59 each extend from one of the walls 57, 57 to another end 60, 60 of the axle segments. Cam drivers 61, 61 are formed at each end 60, 60 of the axle segments 59, 59, each of the cam drivers 61, 61 having a cam surface 62, 62. The edges 63, 63 of the two cam drivers 61, 61 are substantially flat and are spaced apart from one another in the lever arm interior portion 58 a sufficient distance such that the flattened sides 36a, 36a of the skewer 30 can pass between and move axially relative to the edges 63, 63. The distance between the edges 63, 63 is, however, preferably such that the skewer 30 is not able to rotate when held between the edges. As seen in FIG. 9B, the axle segments 59, 59 and the cam drivers 61, 61 comprise different sized cylinders having parallel but off-set axes from one another. In operation, the longitudinal axis of the skewer 30 passes substantially through a longitudinal axis of the axle segments 59, 59.

Figure 2:
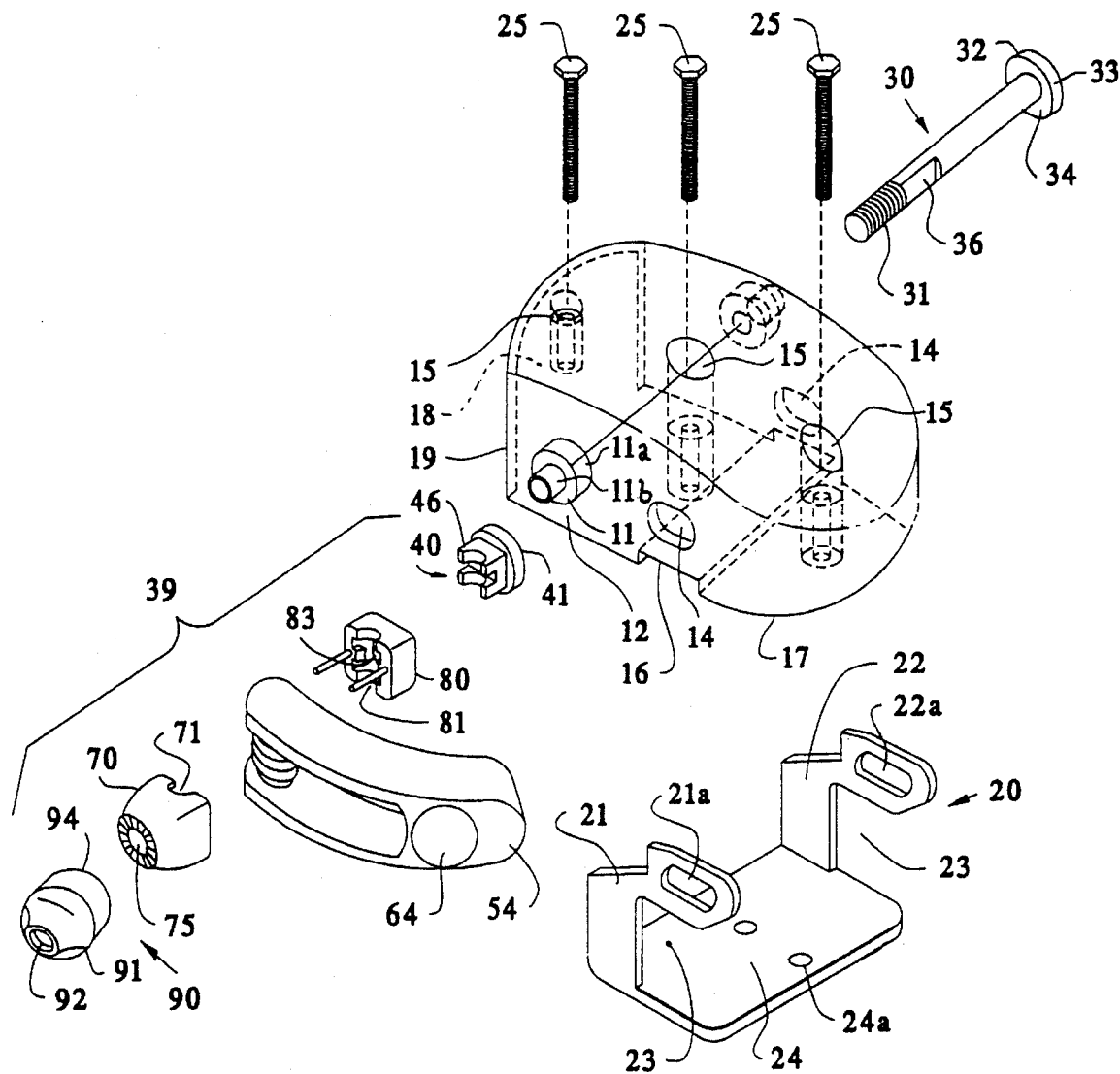
FIG. 2 is an exploded perspective view of a lockable quick release mechanism.
Figure 3:
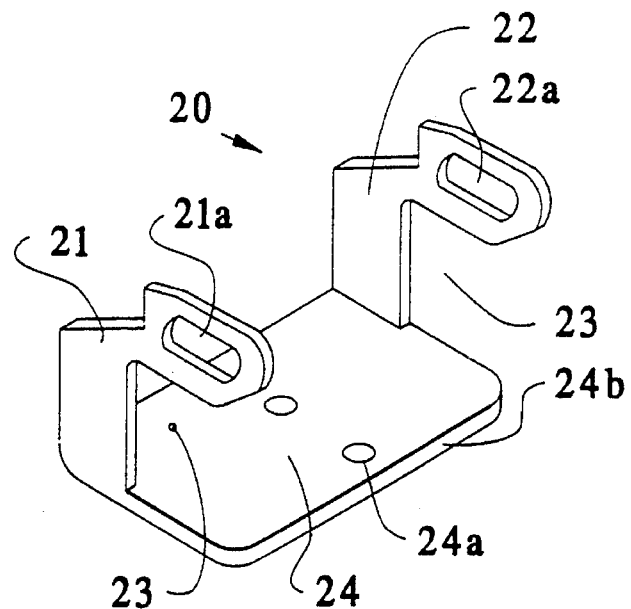
FIG. 3 is a perspective view of an underbar plate.
Figure 6:
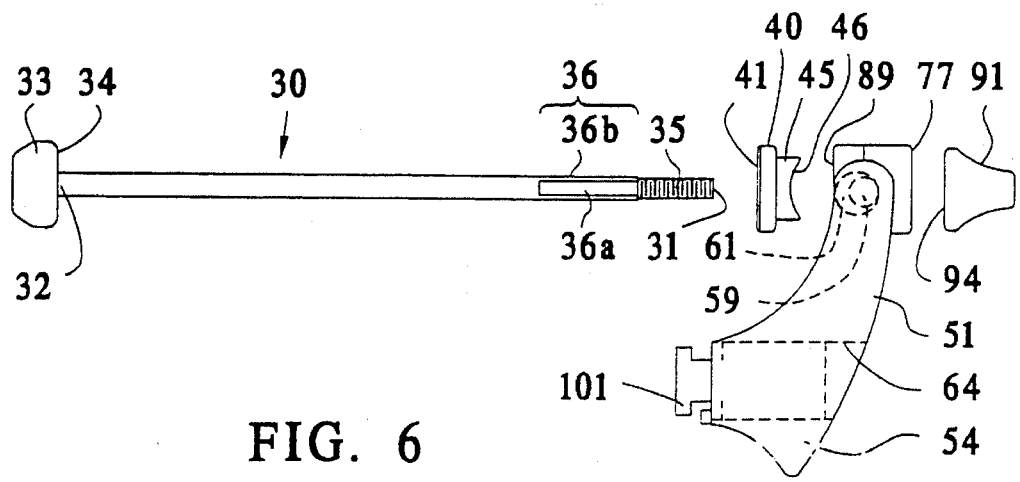
FIG. 6 is an exploded top view of a portion of a lockable quick release mechanism showing an assembled means for moving a movable bearing disc member.
Figure 7:
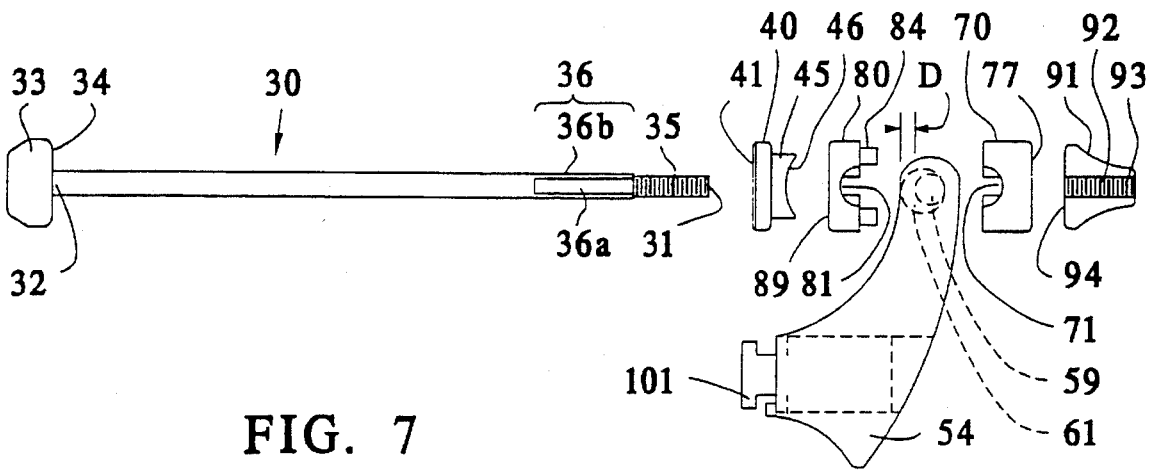
FIG. 7 is an exploded top view of a portion of a lockable quick release mechanism as in FIG. 6, further showing an exploded means for moving a movable bearing disc member.
Figure 10A:
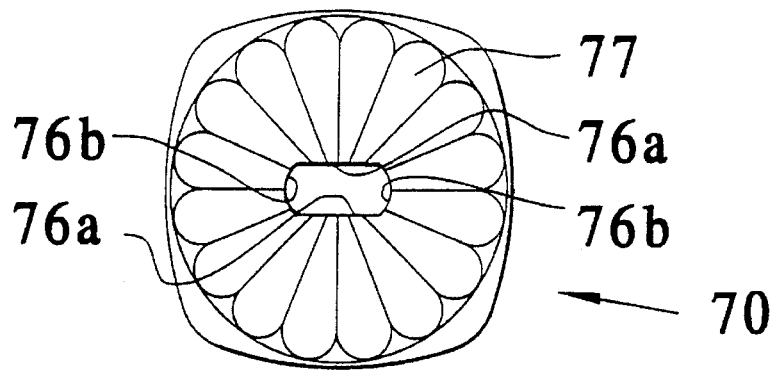
FIGS. 10A–10C are top, side, and bottom views of a portion of the means for moving a movable bearing disc member.
Figure 10B:
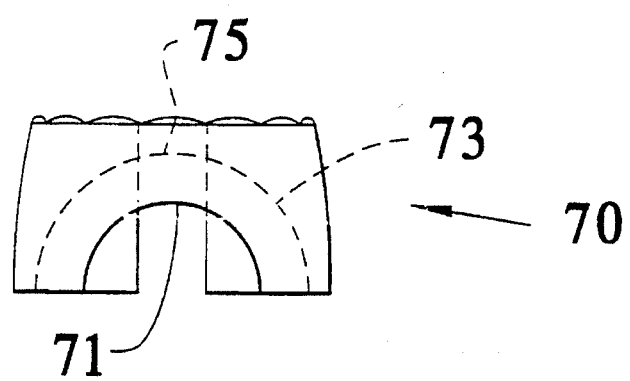
Figure 10C:
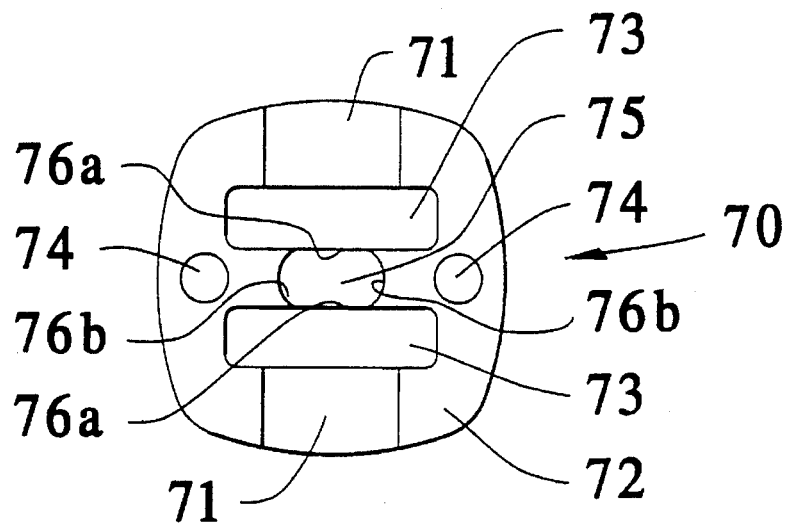

With reference to FIGS. 2, 6, and 7, a pivot upper half 70 and a pivot lower half 80 are closed over the cam drivers 61, 61 and portions of the axle segments 59, 59. With reference to FIGS. 10A–10C, the pivot upper half 70 has two substantially half-circular recesses 71, 71 having a slightly larger radius than the axle segments 59, 59. The side walls 72, 72 of the pivot upper half 70 by the half-circular recesses 71, 71 are slightly thinner than the length of an axle segment 59, such that the side walls of the pivot upper half are received between the interior walls 57, 57 of the lever arm first end 56, the axle segments 59, 59 each extend across the half-circular recesses in the side walls, and the cam drivers 61, 61 are disposed between the side walls. The pivot upper half 70 is further provided with recesses 73, 73 which receive the cam drivers 61, 61 and permit the cam drivers to turn in the lever housing top.

Figure 11C:
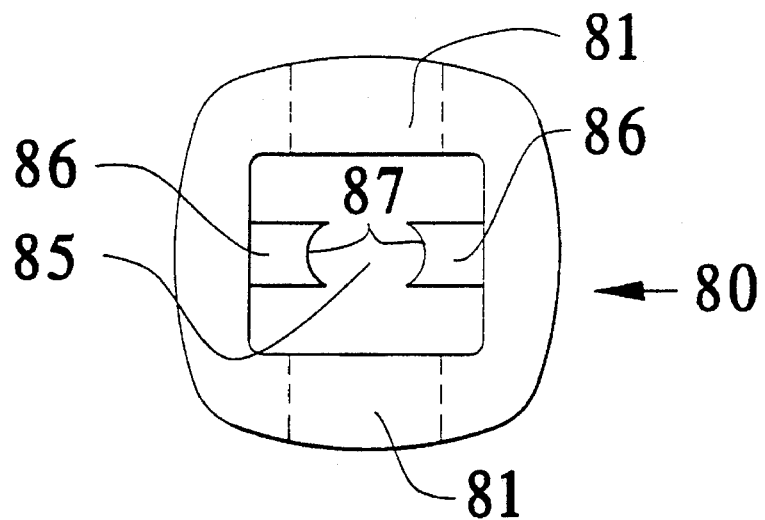
FIGS. 11A–11C are top, side, and bottom views of a portion of the means for moving a movable bearing disc member.
Figure 11B:
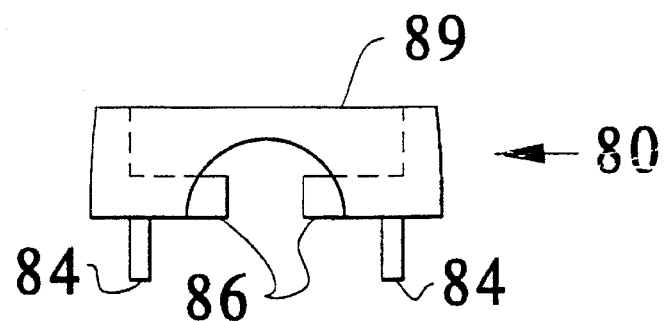
Figure 11A:
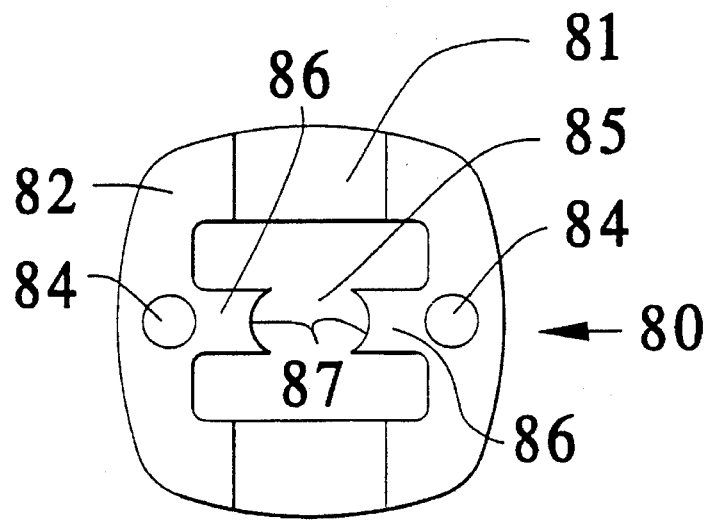

The pivot lower half 80 is formed to close, with the pivot upper half 70, around the axle segments 59, 59 and the cam drivers 61, 61. As best seen in FIGS. 11A–11C, the pivot lower half 80 has two substantially half circular recesses 81, 81 having a slightly larger radius than the axle segments 59, 59. The side walls 82, 82 of the pivot upper half 80 by the half-circular recesses 81, 81 are slightly thinner than the length of an axle segment 59, such that the side walls of the pivot lower half are received between the interior walls 57, 57 of the lever arm first end 56, the axle segments 59, 59 each extend across the half-circular recesses in the side walls, and the cam drivers 61, 61 are disposed between the side walls.

The pivot lower half 80 is further formed with a removed portion 83 for receiving the cam drivers 61, 61. A portion of the cam follower 45 is able to extend through the removed portion such that the cam follower surfaces 46, 46 can contact the cam drivers 61, 61. The removed portion 83 further permits the cam drivers 61, 61 to turn in the pivot lower half 80.

Figure 8C:
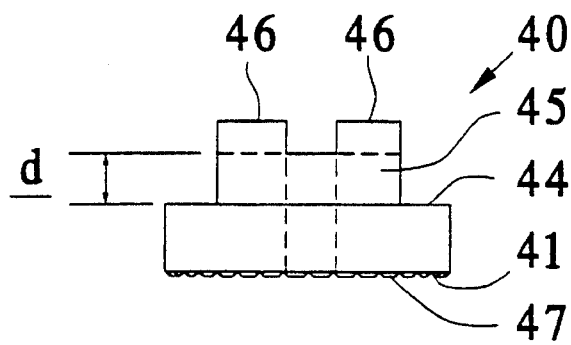
Figure 8D:
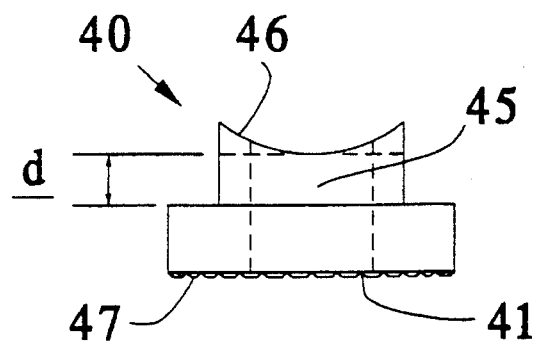

The cam surfaces 62, 62 of the cam drivers 61, 61 preferably extend to the bottom face 89 of the pivot lower half 80 when the lever 51 is in the second position 53. Further, the cam surfaces 62, 62 preferably do not extend past the radius defined by the half-circular recesses 81, 81 of the pivot lower half 80 when the lever 51 is in the first position 52. As noted above, the follower surfaces 46, 46 are raised the distance d above the opposite side 44 of the movable member 40. When the distance d, shown in FIGS. 8C and 8D, is set to be equal to or greater than the distance D, representing the maximum distance from the radius of the axles 59, 59 to the periphery of the cam surfaces 62, 62, shown, for example, in FIG. 9B, the follower surfaces 46, 46 are able to remain in contact with the cam surfaces 62, 62 of the cam drivers 61, 61 when the cam drivers turn as the lever arm 51 is turned from the first position 52 to the second position 53. By setting the distance d to be less than the distance D, the follower surfaces contact the cam surfaces 62, 62 as they are moved through the distance d over only that portion of the distance D equal to the distance d. The distances d and D are preferably equal to one another.

As shown in FIGS. 10C, 11A, and 11C, the pivot upper half and lower half 70, 80 are preferably formed with a pin 84 and a pin receiving recess 74 for attaching the pivot upper half and lower half to one another. While the pin 84 and the pin receiving recess 74 are depicted as being formed on the pivot lower half 80 and the pivot upper half 70, respectively, they may, of course, be formed on either housing part so that the parts are able to be attached together. Further, any desired conventional means for attaching the pivot upper half and lower half 70, 80 together may be used, such as welding or bolting the upper and lower halves together.

As shown in FIGS. 10A, 10C, 11A, and 11C, the pivot upper half 70 and the pivot lower half 80 are, like the movable member 40, formed with through holes 75 and 85, respectively, the through holes being shaped to permit axial movement of the skewer 30 through the pivot upper half and lower half. As noted above, the skewer 30 is preferably formed with a flattened portion 36. The through hole 75 has a flat edge 76a and a rounded portion 76b such that the skewer 30 fits through the through hole 75 and is axially, but not rotationally, movable relative to the pivot upper half 70, the shape of the through hole being such that the flattened portion 36 is rotationally held in position. The pivot lower half 80 includes projecting portions 86 with concave edges 87 for receiving non-flattened portions 36b, 36b of the skewer by the flattened portion 36. When the quick release mechanism 1 is assembled, the cam drivers 61, 61 are disposed on either side of the projecting portions 86, 86 and the skewer 30 is prevented from rotating relative to the pivot lower half by the flattened sides 36a, 36a being held between the flat edges 63, 63 of the cam drivers.

With reference to FIGS. 5A, 5B, 6, and 7, when the pivot upper half 70 and lower half 80 are closed around the axle segments 59, 59 and cam drivers 61, 61 of a lever arm 51, pivoting of the lever arm from the first position 52 to the second position 53 causes the axle segments to turn in the circular recesses formed by the half-circular recesses 71, 71 and 81, 81, and causes the position of the cam surfaces 62, 62 of the cam drivers to be changed relative to the circular recesses. When the cam follower 45 of a movable member 40 is disposed adjacent to the moving means 50 on a skewer 30, such that the cam follower surfaces 46, 46 contact the cam driver surfaces 62, 62, pivoting of the lever arm 51 from the first position 52 to the second position 53 causes the movable member 40 to be moved axially away from the moving means through the distance D, shown in FIGS. 5A, 5B and 9B, as the cam driver surfaces 62, 62 turn around the circular recesses formed by the half-circular recesses 71, 71 and 81, 81.

The quick release mechanism is further provided with a means 90 for adjusting the moving means 50 to prevent the moving means from moving axially in one direction past desired axial positions on the skewer 30. The adjusting means 90 is provided on the same side of the skewer 30 as the moving means 50. The adjusting means 90 includes an adjustable stop, in the illustrated embodiment an adjusting knob 91 having an axial bore 92 with internal threads 93 for being screwed over threads 35 on the first end 31 of the skewer 30. The knob 91 is positioned at desired axial positions on the skewer 30 by screwing or unscrewing the knob. When the knob 91 is positioned in a desired axial position on the skewer 30, the knob stops the moving means 50 from moving axially on the skewer past a bearing surface 94 of the knob which contacts a bearing surface 77 of the pivot upper half 70.

By positioning the knob 91 at various positions on the skewer 30, the quick release mechanism 1 is able to accommodate bicycle forks 2 having various distances between interior sides 4 of prongs 3 and to secure prongs having various thicknesses. The bearing surfaces 77 and 94 are preferably provided with surface patterns, such as radial projecting and recessed portions, such that the surfaces interengage with one another when they contact. Because the moving means 50 is unable to turn relative to the skewer, the knob 91 is substantially prevented from being inadvertently turned relative to the skewer 30 when the surfaces 77 and 94 are interengaged. Further, when the surfaces 77 and 94 are interengaged as the lockable quick release mechanism 1 secures a bicycle fork, the surfaces are ordinarily tightly clamped together, making movement of the surfaces relative to one another substantially more difficult.

The second end 54 of the lever arm 51 includes a bore 64 for receiving the lock assembly 100. A recess 14 is also formed in at least one side of the fork block 10 for receiving a bolt 101 of the lock assembly 100. Preferably, a recess 14 is formed on two sides of the fork block 10, such that the fork block is substantially symmetrical about a centerline (not shown) and so that the bolt 101 may be received by either side of the fork block. When the lever arm 51 is moved to the second position 53 to clamp the prongs 3 of a bicycle fork 2 around the fork block 10, the lever arm may be locked to the fork block by the lock assembly 100. The L-shaped leg 21 of the underbar plate 20 is also formed with a bolt receiving recess 21a to lock the lever arm 51 to the underbar plate in addition to, or instead of, locking the lever arm to the fork block 10. Locking the lever arm 51 to the fork block 10 or the underbar plate 20 with the lock assembly 100 effectively locks the entire fork block and the underbar plate to the bar 7.

As noted above, the leg 22 is preferably also L-shaped. Further, the leg 22 is preferably formed with a bolt receiving recess 22a such that the skewer 30 may be inserted through the fork block 10 through either one of the bores 12, 12 and the movable member 40, the moving means 50, and the adjusting knob 91 may be positioned on the skewer so that the lever arm 51 may be locked to the underbar plate 20 through either the recess 21a or the recess 22a. If desired, however, the leg 22 may be straight and not provided with a bolt receiving recess so that the lever arm 51 is lockable to the underbar plate 20 only through the recess 21a.

The lock assembly 100 preferably comprises a lock cylinder 101 having a T-shaped bolt 102 for being received in the bolt receiving recesses 21a or 22a of the L-shaped legs 21 or 22 and the recess 14 of the fork block 10. The lock cylinder 101 is adapted to be inserted into the recess 64 in the end 54 of the lever 51 when a series of projecting elements 103 that project radially from the cylinder 101 are retracted into the cylinder, such as by inserting a key 104 into the cylinder. The lock cylinder 101 is turned through ninety degrees in the recess 64 by the key 104 to retract the projecting elements 103. When the cylinder 101 is turned through ninety degrees, the T-shaped bolt 102 turns in the bolt receiving recess 21a and the recess 14 and is prevented from being withdrawn therefrom. A user may withdraw the key 104 to prevent unauthorized opening of the quick release mechanism 1.

In operation, when the lever arm 51 is turned from the first position 52 to the second position 53, the center of the lever arm passes substantially through the axis of the skewer 30. The lever arm interior portion 58 is, therefore, sufficiently large to permit the lever arm 51 to be turned between the first and second positions 52, 53 while allowing the adjusting knob 91 and the first end 31 of the skewer 30 to be disposed within the interior portion.

Figure 1B:
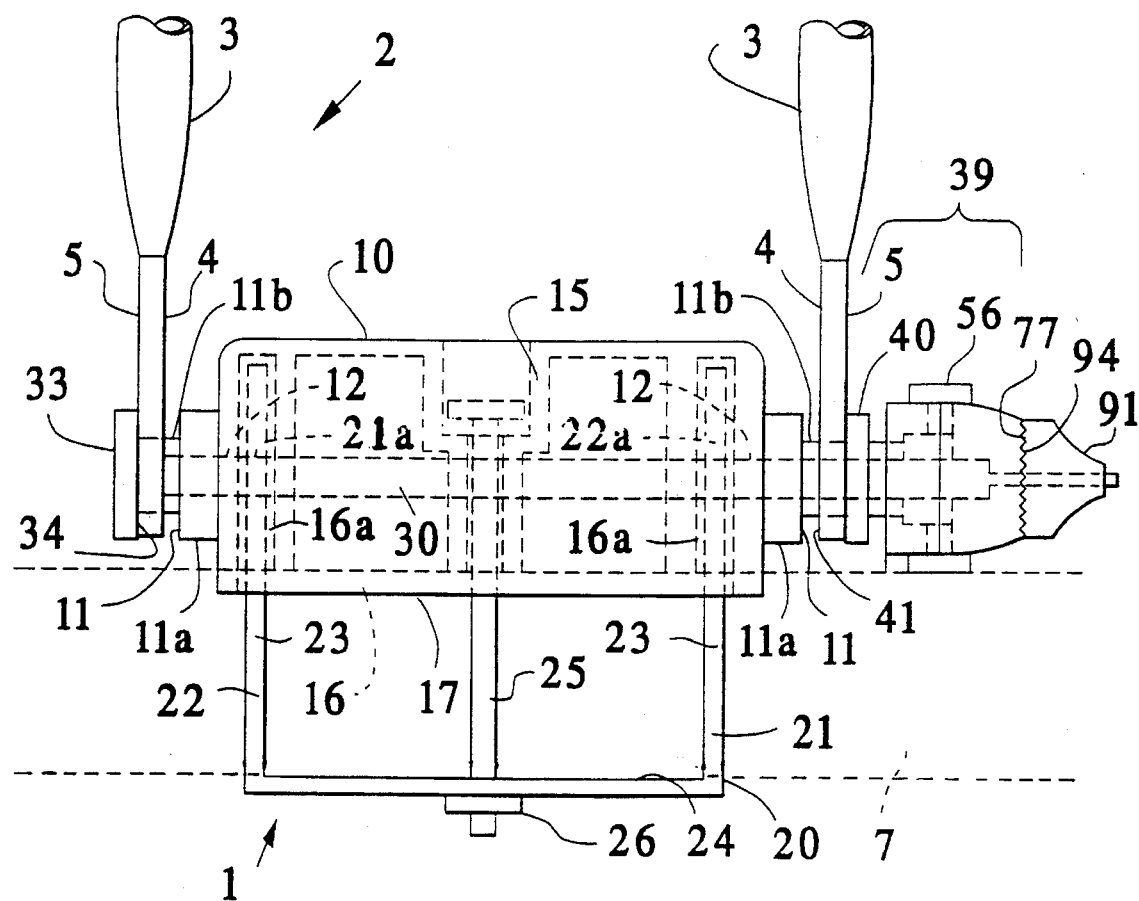
FIG. 1B is a front view of the lockable quick release mechanism of FIG. 1A.
Figure 12:
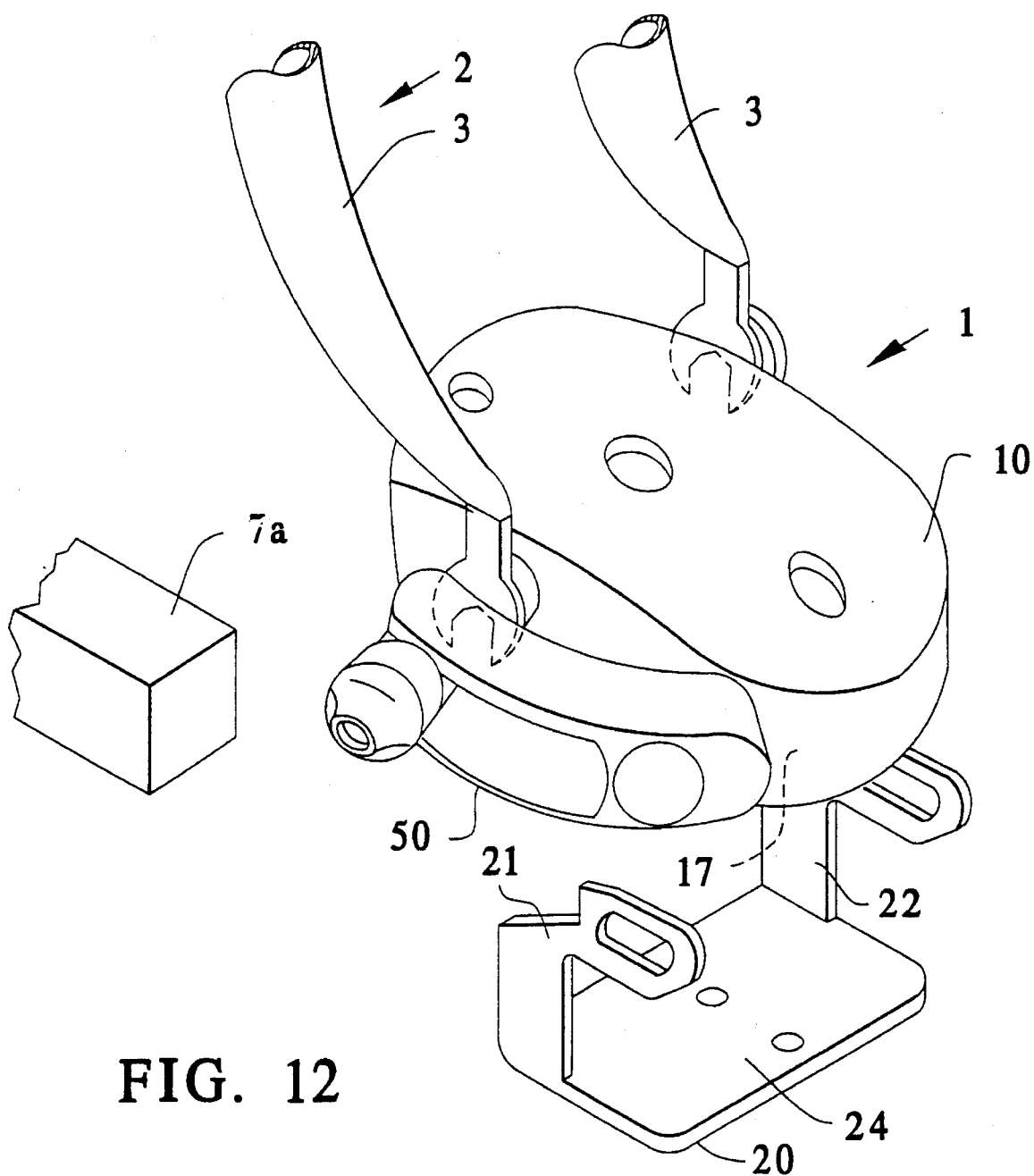
FIG. 12 is a top perspective view of a lockable quick release mechanism according to another embodiment of the present invention.

As shown, for example, in FIGS. 1A and 1B, the fork block 10 and the underbar plate 20 of the lockable quick release mechanism 1 described above may be attached around a longitudinal member such that a car roof rack bar 7 is substantially parallel to the skewer 30. As shown in FIG. 12, it is also possible to arrange a lockable quick release mechanism such that the skewer is perpendicular to a longitudinal member such as a car roof rack bar 7a. In this arrangement, the bar 7a passes between the legs 21, 22 of the underbar plate 20 and the fork block 10 and the underbar plate are attached to one another around the bar so that the legs and the bottom 24 of the underbar plate and the bottom 17 of the fork block surround the bar on four sides.

Figure 13:
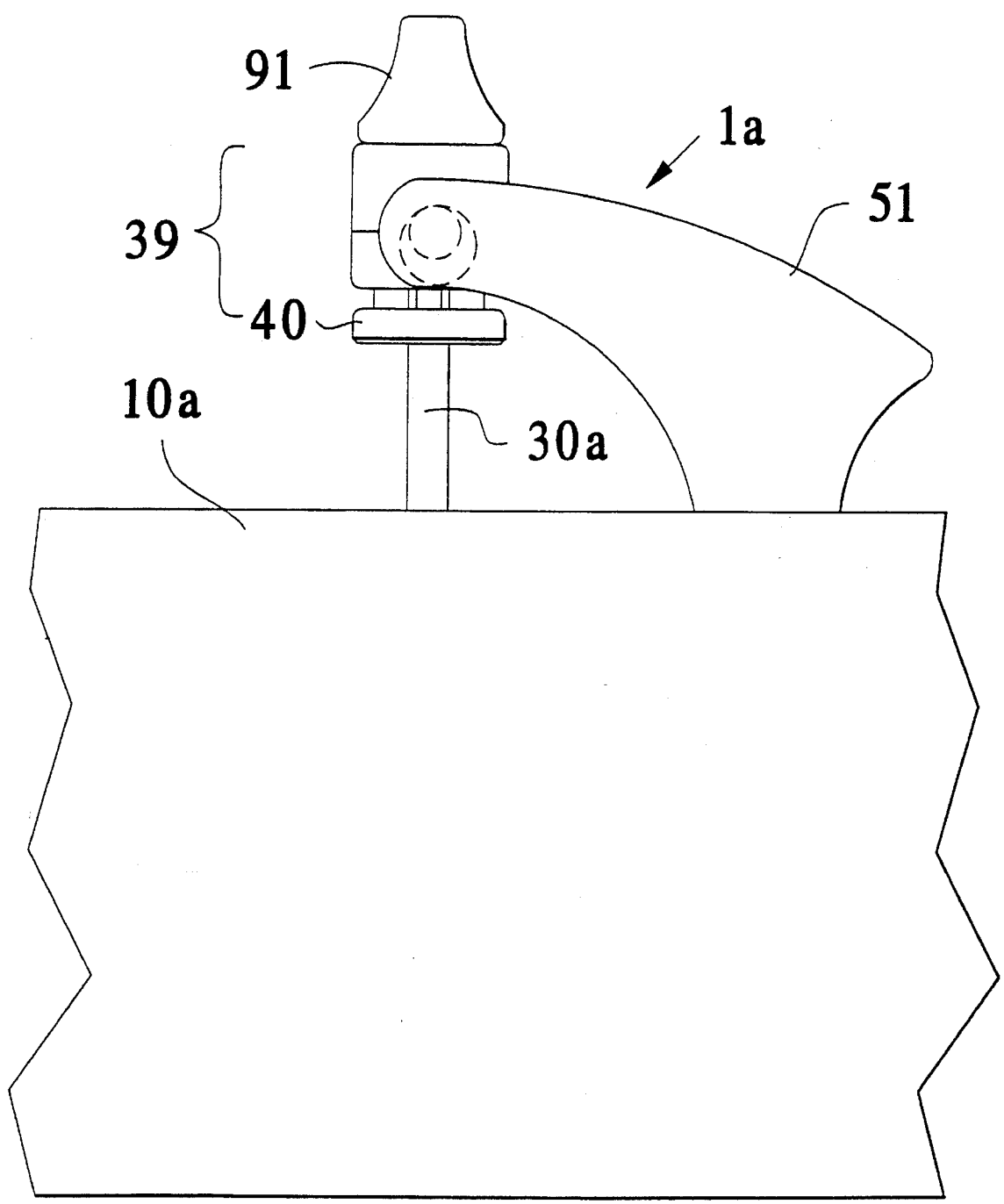
FIG. 13 is a top view of lockable quick release mechanism according to another embodiment of the present invention.

Thus far, the lockable quick release mechanism has been described primarily with regard to embodiments in which a skewer 30 is axially movable relative to a fork block 10. As seen in FIG. 13, however, a skewer 30a may be fixed to a fork block 10a. The fork block 10a may be part of a car roof rack formed with a skewer 30a projecting substantially perpendicularly to a longitudinal bar or tray of the roof rack. While the depicted lockable quick release mechanism 1a is adapted to receive one prong 3 of a structure such as a bicycle fork 2, another lockable quick release mechanism 1a that is substantially a mirror image of the first lockable quick release mechanism may be added to the other side of the fork block 10a, the skewer 30a of the second mechanism being axially aligned with the skewer 30a of the first mechanism.

The skewer 30a may be attached to the fork block 10a by any number of conventional techniques, such as welding the skewer to the fork block or forming a bore with an interior thread in the fork block and threading a portion of the skewer to be screwed into the threaded bore.

As noted above, the engaging means 39 preferably includes a movable member 40 which is moved toward the bearing surface 11 of the fork block 10 by the cam surfaces 62, 62 of the lever 51 to clamp a prong 3 between the movable member bearing surface 41 and the fork block bearing surface 11. The bearing surface 41 of the movable member 40 is preferably specifically formed for abutting against a prong 3. It is also possible, however, to clamp a prong 3 between the fork block bearing surface 11 and the cam surfaces 62, 62 of the lever 51 without the use of a movable member. In this embodiment, the cam surfaces 62, 62 of the lever 51 are preferably formed such that they extend to or near to the bottom face 89 of the pivot lower half 80 when the lever is in the first position 52 and sufficiently beyond the bottom face of the pivot lower half when the lever is in the second position 53 to provide an adequate clamping force. By such a structure, it is possible to maneuver the lever 51 such that the entire distance D may be extended from or retracted into the means for moving 50. It is, however, only necessary for the cam surfaces 62, 62 to extend a sufficient distance beyond the bottom face 89 of the pivot lower half 80 such that a bicycle prong 3 may be clamped directly between the cam surfaces 62, 62 and the fork block bearing surface 11 without the intermediary of a movable member 40.

It is, of course, possible to embody the invention in specific forms other than those described above without departing from the spirit of the present invention. The embodiments described above are merely illustrative and should not be considered restrictive in any way. The scope of the invention is given in the appended claims, rather than the preceding description, and all variations and equivalents which fall within the range of the claims are intended to be embraced therein.

What is claimed is:

1. A mechanism for retaining prongs of a bicycle for transportation of the bicycle on a carrier on a vehicle, comprising:

a skewer, a portion of the skewer being adapted to receive the prongs;

a block for receiving the skewer having a first and second bearing surfaces, the skewer extending substantially perpendicularly from the first and second bearing surfaces;

means for securing the block to a portion of the carrier;

means for engaging the prongs to clamp the prongs to the first and second bearing surfaces, the engaging means being mountable on the skewer and axially movable thereon; and means for adjusting a range of movement of the engaging means between axial positions on the skewer, the adjusting means being mounted on the skewer and axially movable thereon;

a portion of the skewer being threaded and the adjusting means having a skewer receiving interior thread for mounting the adjusting means on the skewer; and means for preventing the adjusting means from moving relative to the skewer.

2. The mechanism of claim 1, wherein the adjusting means has an adjusting means bearing surface and the engaging means has an engaging means bearing surface, the adjusting means bearing surface and the engaging means bearing surface being adapted to contact one another.

3. The mechanism of claim 1, wherein the preventing means comprises means for holding the engaging means in a rotational orientation relative to the skewer and means for interengaging the engaging means and the adjusting means such that the engaging means and the adjusting means are non-rotatable relative to one another.

4. The mechanism of claim 3, wherein the interengaging means comprises an engaging means bearing surface on the engaging means and an adjusting means bearing surface on the adjusting means, the engaging means bearing surface and the adjusting means bearing surface being formed such that they are interengagable with one another.

5. The mechanism of claim 1, further comprising means for holding the engaging means in a rotational orientation relative to the skewer.

6. The mechanism of claim 5, wherein the holding means comprises a portion of the skewer formed with a non-circular periphery and a skewer-receiving channel in the engaging means having an non-circular interior periphery in which the portion of the skewer having the non-circular periphery is receivable and is non-rotatable.

7. The mechanism of claim 1, wherein the engaging means comprises a movable member being mountable on the skewer and axially movable thereon, the prong being receivable between the movable member and the first bearing surface, and means for moving the movable member toward the first bearing surface, the moving means being mountable on the skewer and axially movable thereon.

8. The mechanism of claim 1, wherein the engaging means comprises:

a lever, the lever being mountable on the skewer, axially movable thereon, and pivotable relative thereto about a lever pivot axis; and a cam surface, the cam surface being adapted to move toward the first bearing surface when the lever is pivoted.

9. The mechanism of claim 8, wherein the lever pivot axis and the skewer substantially intersect and are substantially perpendicular.

10. The mechanism of claim 8, wherein the end of the lever forms the cam surface.

11. The mechanism of claim 8, further comprising means for locking the lever when the cam surface is moved toward the first bearing surface.

12. The mechanism of claim 11, further comprising an underbar plate, the underbar plate being adapted to at least partially surround a bar of a carrier, the locking means locking together the lever, the underbar plate, and the first bearing surface.

13. The mechanism of claim 12, wherein the underbar plate has a bottom and an L-shaped leg, the L-shaped leg forming a substantially U-shaped recess with the bottom, a bar of a carrier being receivable in the U-shaped recess.

14. The mechanism of claim 13, wherein the L-shaped leg has a recess, the locking means includes an engaging portion, the locking means being adapted to be oriented such that, in an open position, the engaging portion is receivable in and removable from the recess and, in a locking position, the engaging portion engages the L-shaped leg through the recess in the L-shaped leg and is not removable therefrom.

15. The mechanism of claim 11, wherein the locking means locks the lever and the first bearing surface together.

16. The mechanism of claim 11, wherein the adjusting means has an adjusting means bearing surface and the engaging means has an engaging means bearing surface, the adjusting means bearing surface and the engaging means bearing surface being adapted to contact one another.

17. The mechanism of claim 1, wherein the first bearing surface forms at least a portion of a side of a block, the block having an opening for receiving a carrier tray, the opening being formed to be substantially perpendicular to the first bearing surface.

18. A mechanism for retaining a pair of prongs of a bicycle fork, comprising:

a skewer, the skewer having a flange at a first end thereof, the flange having a flange bearing surface;

a block, the block having first and second bearing surfaces on first and second sides thereof, respectively, a through hole extending through the block from the first one of the bearing surfaces to the second one of the bearing surfaces, the skewer being axially movable in the through hole, the flange being unable to move into the through hole past the second bearing surface on the second side;

an adjustable clamping assembly attached to a second end of the skewer, the clamping assembly including a housing, the housing being movably mounted on the second end of the skewer, a lever, a first end of the lever being pivotably mounted on the housing, the lever including a cam surface, a clamping body, the clamping body including a cam follower disposed in the housing and a clamping body bearing surface disposed outside of the housing, pivoting of the lever causing the clamping body bearing surface to be urged further outside of the housing, and a stop, the stop being movably mounted on the second end of the skewer over a range of movement to prevent axial movement of the housing beyond the stop, and a lock assembly, the lock assembly including a first portion on a second end of the lever and a second portion, lockable to the first portion, on a first side of the block.

19. The mechanism as set forth in claim 18, wherein the stop includes an internally threaded bore and the second end of the skewer is externally threaded.

20. The mechanism as set forth in claim 19, further comprising means for preventing the stop from moving relative to the skewer.

21. The mechanism as set forth in claim 20, wherein the housing is non-rotatable relative to the skewer and the preventing means includes a surface of the stop and surface of the housing, the stop surface and the housing surface being engageable to prevent rotation of the stop relative to the skewer, thereby preventing movement of the stop relative to the skewer.

22. A mechanism for retaining a pair of prongs of a bicycle fork for transportation of the bicycle on a carrier on a vehicle, comprising:

a skewer, the skewer having a member at a first end thereof, the member having a bearing surface;

a block, the block having first and second bearing surfaces on first and second sides thereof, respectively, a through hole extending through the block from the first one of the bearing surfaces to the second one of the bearing surfaces, the skewer being axially movable in the through hole, the member being unable to move into the through hole past either of the bearing surfaces on the sides of the block;

means for securing the block to a portion of the carrier; and a clamping assembly attached to one end of the skewer, the clamping assembly including a housing, the housing being movably mounted on said one end of the skewer, a lever, a first end of the lever being pivotably mounted on the housing, the lever cooperating with a cam surface, a clamping body, the clamping body including a cam follower disposed in the housing and a clamping body bearing surface disposed on an outside of the housing, pivoting of the lever causing movement of the housing, and a fixed stop mounted on only one of the first and second ends of the skewer to prevent outward axial movement of one of the member and the housing beyond the stop, and a lock assembly arranged in the housing for preventing movement of the housing.

23. A mechanism for retaining prongs of a bicycle for transportation of the bicycle on a carrier for a vehicle, comprising:

a block, the block having a first bearing surface on a first side thereof;

means for securing the block to a portion of the carrier;

a skewer having first and second ends, said skewer extending through the block and having the first end extending from the first bearing surface; and an adjustable clamping assembly attached to the first end of the skewer, the clamping assembly including a clamping body movably mounted on the first end of the skewer, the clamping body including a clamping body bearing surface, urging means, movably mounted on the first end of the skewer, for urging the clamping body bearing surface toward the first bearing surface, and a stop, the stop being movably mounted on one of the first and second ends of the skewer over a range of movement to limit outward axial movement of the urging means on the skewer; and a fixed stop arranged on the other end of the skewer opposite said one end having the stop.

24. A mechanism for retaining a pair of prongs of a bicycle fork for transportation of a bicycle on a carrier for a vehicle, comprising:

a skewer having first and second ends, portions of the skewer being adapted to receive the prongs;

a block, the block having a through hole extending through the block for receiving the skewer, the skewer being axially movable in the through hole and extending from both sides of the block;

means for securing the block to a portion of the carrier;

the skewer having a fixed stop on one of the first and second ends thereof and a member on the other end thereof, a clamping assembly being provided on one of the one end and the other end of the skewer, the member and the clamping assembly each including a bearing surface directed toward the block, said fixed stop preventing further outward axial movement of the bearing surface of one of the clamping assembly and the member relative to the skewer; and the clamping assembly including a lever pivotally mounted on a housing for the clamping assembly, pivoting of the lever causing movement of the housing along the skewer.

* * * * *